(12) United States Patent
Haynes

(10) Patent No.: US 8,028,247 B2
(45) Date of Patent: Sep. 27, 2011

(54) SYSTEM AND METHOD FOR WINDOW NAVIGATION IN GUI ENVIRONMENT

(75) Inventor: Christopher M. Haynes, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2272 days.

(21) Appl. No.: 10/794,831

(22) Filed: Mar. 5, 2004

(65) Prior Publication Data

US 2005/0198585 A1     Sep. 8, 2005

(51) Int. Cl.
   *G06F 3/048* (2006.01)
(52) U.S. Cl. .................. 715/802; 715/781; 715/794
(58) Field of Classification Search .................. 715/781, 715/802, 794
   See application file for complete search history.

(56) References Cited

U.S. PATENT DOCUMENTS

| | | | |
|---|---|---|---|
| 5,544,299 A * | 8/1996 | Wenstrand et al. | 715/804 |
| 5,564,002 A * | 10/1996 | Brown | 715/778 |
| 5,673,403 A | 9/1997 | Brown et al. | |
| 5,734,380 A * | 3/1998 | Adams et al. | 715/804 |
| 5,835,088 A * | 11/1998 | Jaaskelainen, Jr. | 715/803 |
| 5,892,511 A * | 4/1999 | Gelsinger et al. | 715/794 |
| 6,057,835 A | 5/2000 | Sato et al. | |
| 6,915,491 B2 * | 7/2005 | Hsieh | 715/802 |
| 2003/0095146 A1 | 5/2003 | Roelofs | |
| 2005/0188329 A1* | 8/2005 | Cutler et al. | 715/804 |

FOREIGN PATENT DOCUMENTS

| | | |
|---|---|---|
| JP | 7-114576 | 5/1995 |
| JP | 7-219739 | 8/1995 |

OTHER PUBLICATIONS

CE Software, Inc. "Quickeys for Macintosh", 2000, pp. 1-2.*

* cited by examiner

*Primary Examiner* — Simon Ke
(74) *Attorney, Agent, or Firm* — Coats & Bennett PLLC

(57) ABSTRACT

In a GUI environment including a plurality of windows, a user may establish one or more groups of windows such that the windows comprising each group are related. The user may cycle focus successively between the windows in the group in response to a focus cycle command input by the user. The focus may cycle bidirectionally between the windows in the group in response to bi-directional focus cycle command inputs by the user. The user may shift focus to a window outside of the group by entering a focus shift command.

18 Claims, 3 Drawing Sheets

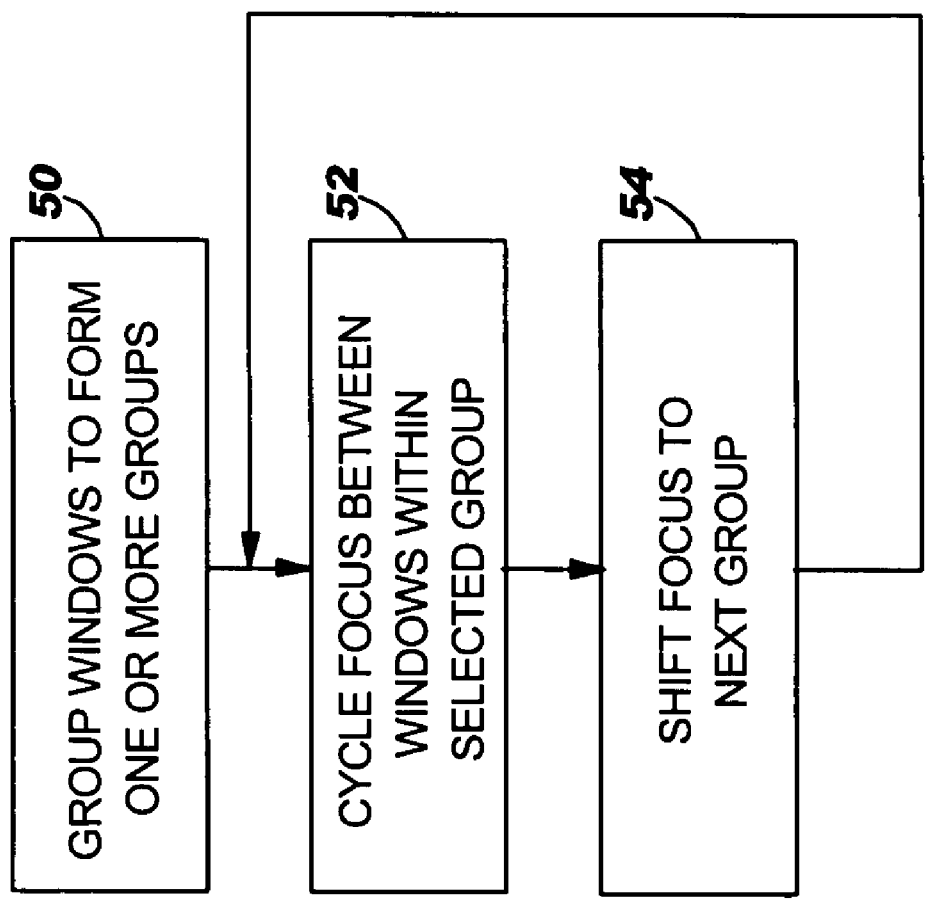

SYSTEM AND METHOD FOR WINDOW NAVIGATION IN GUI ENVIRONMENT

BACKGROUND

The present invention relates generally to the field of software and in particular to a system and method of window navigation in a GUI environment.

The use of Graphical User Interface (GUI) environments is well known in the computer arts, as evidenced by the popularity of the Microsoft Windows® and Apple Computer OS X® operating systems. In these GUI environments, applications run in separate windows, any one of which may be active at a time (also referred to as selected, or receiving the window focus). A window may be selected in a variety of ways. In some GUI environments, placing a cursor on the window for a predetermined time may apply the window focus to that window. In other GUI environments, placing a cursor on the window combined with clicking a mouse key (referred to herein as mouse-selecting) applies the window focus to that window (in some GUI environments, the user may select between these alternatives). In some GUI environments, such as the Microsoft Windows® system, a window may be selected by mouse-selecting an icon associated with the window from the system tray, or bar located at the bottom or to one side of the GUI environment. The Microsoft Windows® system additionally allows a user to cycle the window focus successively from one window to the next by entering the ALT-TAB keystroke combination. However, this method of changing the window focus is limited to cycling through the entire set of open windows, in the order in which the windows were created. The user has no easy way to designate a specific group of windows through which he may wish to cycle the window focus.

SUMMARY

The present invention relates to a method of navigating within groups of windows in a GUI environment by a user. The method includes providing a GUI environment including a plurality of windows, and establishing a group of windows in the GUI such that the windows comprising said group are related. The method then entails cycling focus successively between the windows in the group in response to a focus cycle command input by the user. The focus may cycle bidirectionally between the windows in the group in response to bi-directional focus cycle command inputs by the user. The method further includes shifting focus to a window outside of the group in response to a focus shift command input by the user.

BRIEF DESCRIPTION OF DRAWINGS

FIG. 3 is a flow diagram of a method of window navigation.

DETAILED DESCRIPTION OF THE INVENTION

Figure 1:
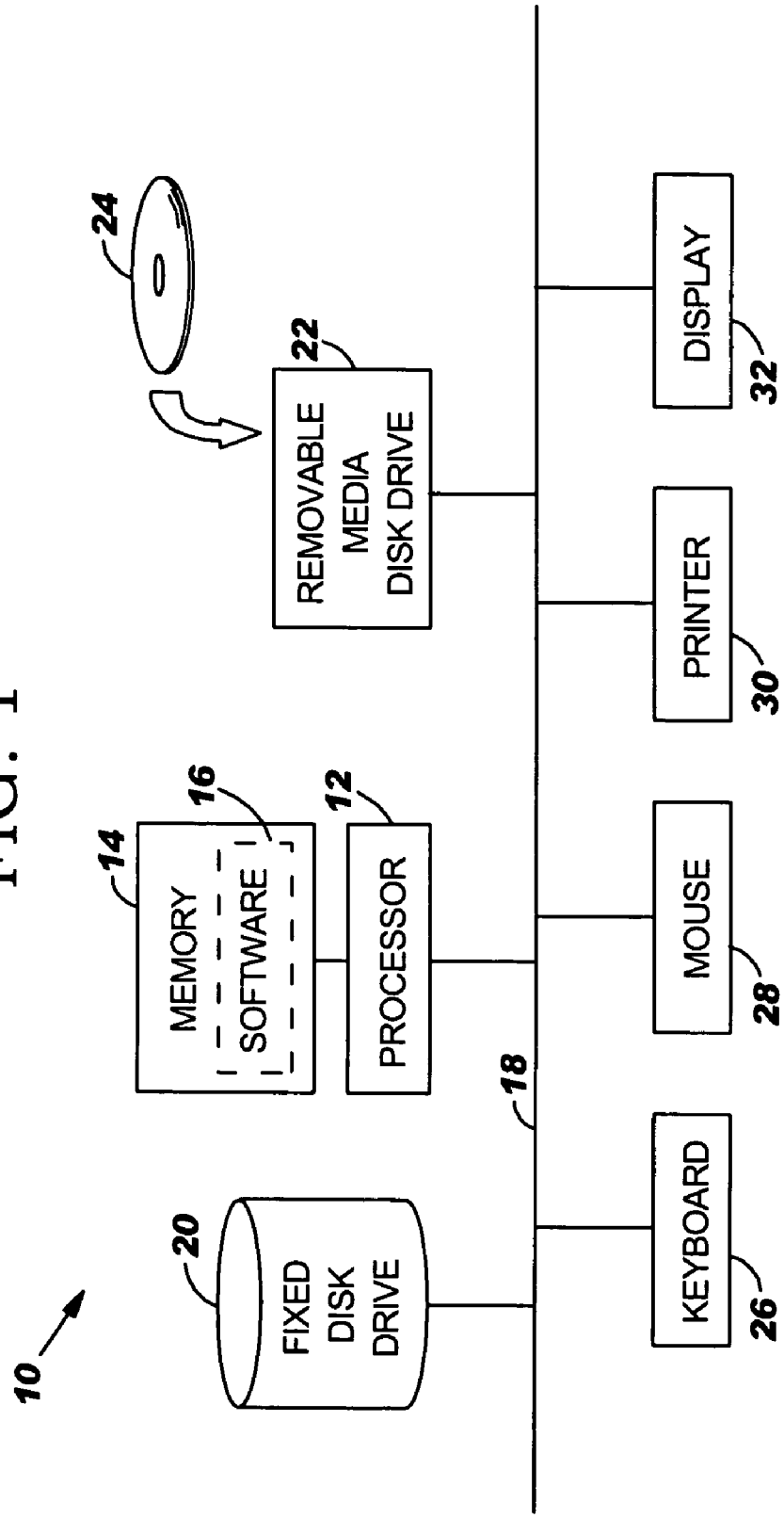
FIG. 1 is a functional block diagram of a computer system.

FIG. 1 depicts a functional block diagram of a representative computer system, indicated generally by the numeral 10. The computer system 10 includes a processor 12 capable of executing stored instructions. Connected to the processor 12 is memory 14 that, in operation, stores software 16. Software 16 may include an operating system and/or software running under the operating system that provides a Graphical User Interface (GUI) environment for interaction with the user.

The processor 12 is connected to a bus 18, to which are connected a variety of data storage devices and input and output devices. For example, a fixed disk drive 20 containing a computer-readable medium, from which GUI software 16 may be loaded into memory 14, may be attached to the bus 18. Additionally, a removable media disk drive 22 that receives removable computer-readable media 24 may be attached to the bus 18. The removable media 24 may comprise a floppy disk, a CD-ROM or DVD-ROM, a magnetic tape, high-capacity removable media, or the like. Removable media 24 may contain a variety of digital data, and in particular may contain GUI software 16. The software 16 may be copied from the removable media 24 to the fixed disk drive 20, and subsequently loaded into memory 14 from the fixed disk drive 20. Alternatively, the software 16 may be loaded directly from the removable media 24 into the memory 14.

Also connected to the bus 18 are input devices such as a keyboard 26 and a mouse 28, as well known in the art. The computer system 10 may additionally include output devices such as a printer 30 or display device 32. Display device 32 may comprise a traditional CRT monitor, a liquid crystal display (LCD), or the like.

Figure 2:
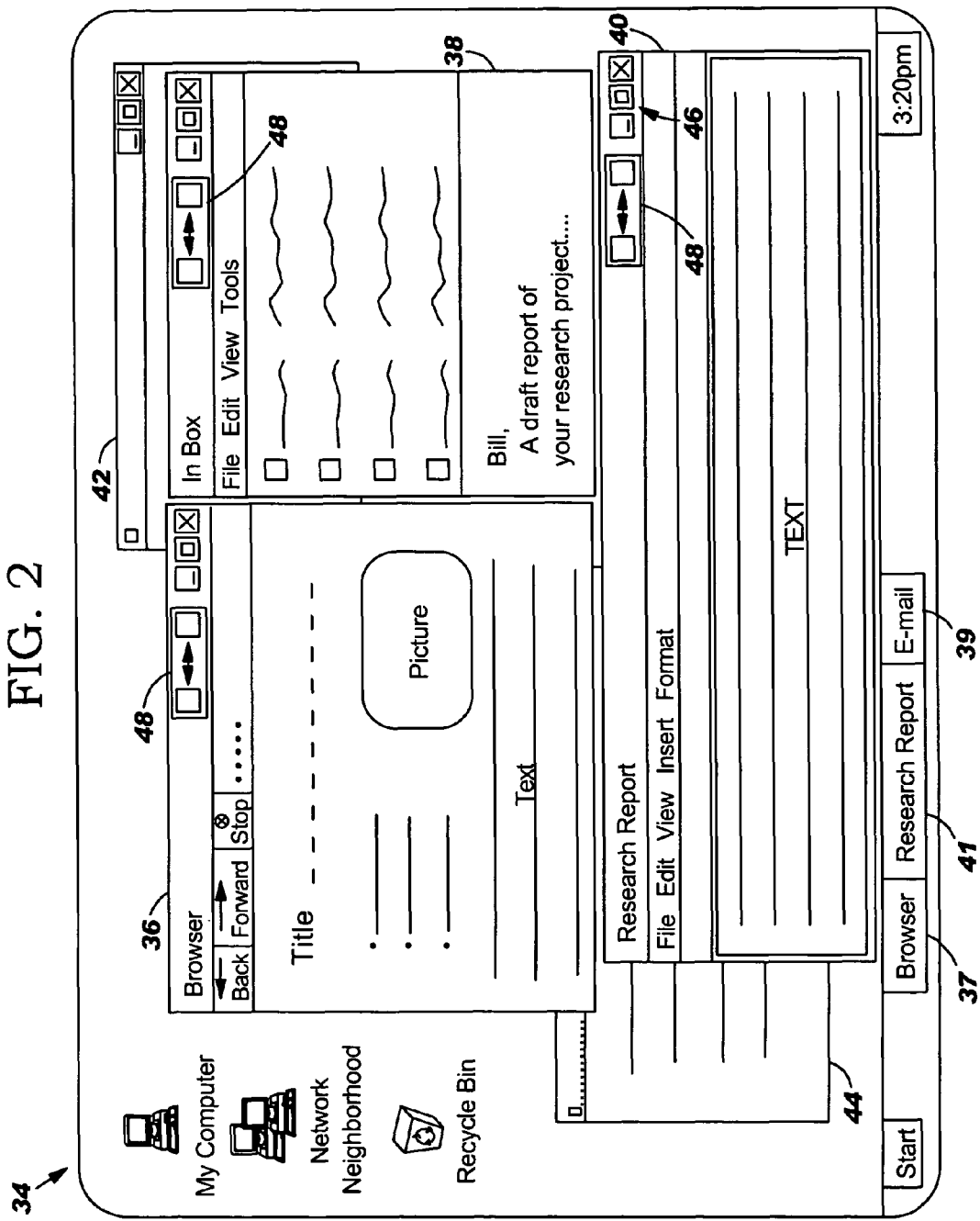
FIG. 2 is representative view of a GUI environment.

In operation, software 16 executing on the computer system 10 provides a GUI environment to the user on the display device 32, as displayed, for example, in FIG. 2, and indicated by the numeral 34. GUI-based operating systems, such as Microsoft Windows® systems and Apple Computer's OS X® operating system, are well known in the art. In general, the GUI environment 34 provides an interface based on the metaphor of a desktop. As is well known in the art, the GUI environment 34 may include a plurality of virtual desktops, with the contents of each virtual desktop being displayed to the user on the display device 32 in response to virtual desktop navigation inputs by the user.

A well-known advantage of a GUI environment is that it allows a user to simultaneously work with multiple, disparate applications, each running in a separate window. For example, FIG. 2 depicts the GUI environment of a user preparing a report. The user has a word processor application running in a window 40, into which he or she may type a report. For research, the user may simultaneously access the Internet via an Internet browser running in window 36. The user may also be reviewing communications with a colleague or collaborator, using an e-mail client running in window 38. In this case, the Internet browser in window 36, the e-mail client in window 38, and the word processor in window 40 are all related to the same task or operation—namely, writing a report. The user may wish to cycle focus between these windows easily, without explicitly selecting each window, and without the need to cycle focus through all of the windows in the GUI environment. According to the present invention, the user may create a group comprising the windows 36, 38, 40, and cycle focus between only the windows 36, 38, 40 using keystrokes.

The windows 36, 38, 40 may be grouped together in a variety of ways. In one embodiment, a window group icon 48 is added to each window 36, 38, 40, 42, 44 by the GUI window manager. The window group icon 48 preferably appears in the window title bar, adjacent the familiar minimize, maximize, and close buttons 46 (in the Windows® desktop environment; other GUI environments typically include similar window management buttons). The window group icon 48 preferably includes a graphic suggestive of grouping windows, such as the two blocks and double-headed arrow as depicted in FIG. 2. In operation, a user may group two windows together by "dragging and dropping" a first window 36 onto the window group icon 48 of a second window 38. This is typically accomplished by moving the cursor to the title bar of the first window 36, pressing a mouse button, moving an indicator such as an outline of the window 36 to the window group icon 48 of a second window 38 (which may indicate pending selecting by, for example, reverse video), and releasing the mouse button—however, the specifics of the drag and drop operation may vary depending on the GUI environment. Upon dropping the first window 36 onto the group window icon 48 of the second window 38, the first window 36 preferably reappears in its original position, and a group association is formed between the two windows 36, 38. A third window 40 may be added to the group by dragging and dropping the third window 40 onto the group window icon 48 of either of the first two windows 36, 38 in the group. The user thus has complete control over which windows 36, 38, 40 to group together into a group, including the number of windows 36, 38, 40 in the group. A user may create multiple, independent groups of windows 36, 38, 40.

According to another embodiment of the present invention, a group is established by the user by entering keystrokes, as opposed to the drag and drop operation of the GUI environment. To form a group, a user may select a first window 36. With the window 36 selected, or receiving the GUI environment focus, the user inputs a window group keystroke combination. The user then selects another window 38, and enters a window group keystroke combination. This ties the two windows 36, 38 together in a group. Additional windows, such as window 40, may be added to the group similarly. Preferably, the window group keystroke combination is a keystroke combination that is not recognized or acted upon by the application running in the relevant window 36, 38, 40. For example, the window group keystroke combination may include one or more qualifier keys, such as CTRL, ALT, SHIFT, or the like, and one or more "regular" keys, such as WG, representing "Window Group." Preferably, the same window group keystroke combination is used to select each of the windows 36, 38, 40 to be added to the group. Alternatively, a first window group keystroke combination may be utilized upon selecting the first window 36 such as for example, CTRL-PageUp, to mimic the "pick up" phase of the drag and drop operation. A second window group keystroke combination may then be used upon selecting the second window 38, such as CTRL-PageDown. The use of separate window group keystroke combinations more closely mimics the "drag and drop" operation using the GUI environment.

As with the drag and drop operation, a user may create multiple, separate groups using the window group keystroke combination. Assuming a first group has been established comprising windows 36, 38, 40, a user may create a second group by selecting, for example, window 42, executing a window group keystroke combination, selecting another window that is not a member of the first group, such as window 44, and entering a window group keystroke combination. This will tie windows 42, 44 into a second group. According to the present invention, there is no limit to the number of window groups that a user may create. In particular, in a virtual desktop in GUI environment, where a large number of windows may be created and maintained, groups are useful for managing windows 36, 38, 40 running related applications, and the group relationship is retained across the virtual desktop spaces.

According to the present invention, navigation between windows within a group is simplified. In particular, a user may cycle window focus among only the windows in a group by the use of focus cycle command inputs. A focus cycle command input may comprise a keystroke combination. Preferably, the keystroke combination is one that is not recognized or acted upon by applications running in the windows 36, 38, 40. The keystroke combination may include one or more qualifier keys, such as CTRL, ALT, SHIFT, or the like, and one or more "directional" keys. Preferably, the focus cycle command input comprises one or more qualifier keys together with the left or right directional arrows (referred to herein as horizontal directional keys) found on most keyboards. As successive focus cycle command inputs are entered, the window focus cycles from one window to the next in the group. Preferably, the window focus cycles bidirectionally, with the left and right arrow keys cycling the focus from one window in the group to another window in the group in reverse direction.

The order of window focus cycling in the group—that is, the order in which the windows in the group are "chained" together for the purpose of cycling window focus—may be the order in which the windows were added to the group. Alternatively, it may be the order in which the windows were created. As another example, it may be the order of last access of the windows.

According to the present invention, the user may shift focus from one group of windows to another group of windows, of from one group of windows to the desktop windows that are not members of any group, by entering focus shift command inputs. Preferably, the focus shift command input comprises one or more qualifier keys together with the up or down directional arrows (referred to herein as vertical directional keys) found on most keyboards, although other keystroke combinations may be used. As successive focus shift command inputs are entered, the window focus cycles from a window in the current group to a window in the next group, or to a window in the desktop. Focus cycle command inputs then cycle the window focus successively among windows in the currently selected group (or the desktop). Preferably, the window focus shifts bidirectionally, with the up and down arrow keys shifting the focus from one group of windows to another group of windows in reverse direction.

Thus, for example, and with reference to FIG. 2, a user may quickly and easily cycle the focus between only the three windows of interest to his task at hand: the Internet browser in window 36, the email client in window 38, and the word processor in window 39, for example by entering ALT-LeftArrow and/or ALT-RightArrow. To shift the focus to the desktop, the user may enter ALT-UpArrow or ALT-DownArrow, and then cycle focus between windows 42 and 44 using the focus cycle command inputs.

FIG. 3 depicts a flow diagram representation of the window management method according to the present invention. A user first groups the desired windows 36, 38, 40 together to form a group, at step 50. This may, for example, comprise dragging and dropping one such window 36, 38, 40 onto the window group icon 48 of another window 36, 38, 40 in the group. Alternatively, this may comprise selecting one window 36, 38, 40, executing a window group keystroke combination, selecting a second window 36, 38, 40 in the group, and executing another window group keystroke combination.

At step 52, the user cycles window focus between the windows 36, 38, 40 within the group, by entering focus cycle command inputs. The focus cycle command inputs are preferably bi-directional, to facilitate cycling among the windows 36, 38, 40 in the most intuitive manner. At step 54, the user shifts focus to another group, or to the desktop. At this point, control returns to step 52, as the user cycles window focus between the windows of the net group of the desktop, by entering focus cycle command inputs.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of navigating within groups of windows in a GUI environment by a user, comprising:
providing a GUI environment including a plurality of windows;
establishing first and second groups of windows, each comprising a subset of two or more but less than all of said plurality of windows in said GUI environment such that the windows comprising said first group are related and the windows comprising said second group are related, by, for each of said first and second groups,
selecting a first window;
dragging said first window to a group icon on a second window; and
dropping said first window on said group icon of said second window, thereby establishing a group relationship between said first and second window;
cycling focus successively between the windows in said first group in response to a focus cycle command input by the user;
shifting focus to a window in said second group in response to a focus shift command input by the user; and
cycling focus successively between the windows in said second group in response to said focus cycle command input by the user.

2. The method of claim 1 wherein cycling focus successively between the windows in said first group comprises cycling focus bidirectionally between the windows in said first group in an order in response to bi-directional focus cycle command inputs by the user.

3. The method of claim 2 wherein the order of focus cycling is the order of window creation.

4. The method of claim 2 wherein the order of focus cycling is set by the user.

5. The method of claim 2 wherein said focus cycle command input comprises the combination of one or more qualifier keys and a horizontal directional key.

6. The method of claim 1 wherein said focus shift command input comprises the combination of one or more qualifier keys and a vertical directional key.

7. The method of claim 1 wherein said second group of windows comprise all windows in said GUI not otherwise members of a group.

8. The method of claim 1 wherein establishing said first group of windows comprises activating an application in said GUI environment that launches multiple windows belonging to the same group.

9. The method of claim 1, further comprising, for at least one of said first and second groups:
selecting a third window;
dragging said third window to a group icon on either said first or second window; and
dropping said third window on said group icon of said first or second window, thereby adding said third window to said group.

10. A computer system, including:
a display device;
at least one input device;
a processor programmed to display a GUI environment including a plurality of windows on said display device, said GUI environment operative to allow a user to form two or more groups of said windows via said input device, by, for each group, selecting a first window, dragging said first window to a group icon on a second window, and dropping said first window on said group icon of said second window, thereby establishing a group relationship between said first and second window, wherein each said group comprises two or more but less than all said plurality of windows, and to cycle focus between windows in said group by entering focus cycle command inputs.

11. The computer system of claim 10 wherein said GUI environment is operative to cycle focus bi-directionally between windows in said group by entering bi-directional focus cycle command inputs.

12. The computer system of claim 11 wherein said input device comprises a keyboard, and wherein said focus cycle command inputs comprise a qualifier key in combination with a horizontal directional key.

13. The computer system of claim 10 wherein said GUI environment is further operative to shift focus to a window outside of said group in response to one or more focus shift command inputs by the user.

14. The computer system of claim 13 wherein said input device comprises a keyboard, and wherein said focus shift command inputs comprise a qualifier key in combination with a vertical directional key.

15. The method of claim 10, wherein said processor is further programmed to allow a user to add a window to one of said groups of said windows via said input device, by, for the group to which a window is to be added,
selecting a third window;
dragging said third window to a group icon on either said first or second window; and
dropping said third window on said group icon of said first or second window, thereby adding said third window to said group.

16. A non-transient computer readable medium which stores computer-executable process steps for a GUI environment including a plurality of windows, said computer-executable process steps causing a computer to perform the steps of:
displaying said GUI environment on a display device;
accepting, from a user, designations first and second groups of windows, each comprising a subset of two or more but less than all of said plurality of windows in said GUI environment such that the windows comprising said first group are related and the windows comprising said second group are related, by, for each of said first and second groups,
selecting a first window;
dragging said first window to a group icon on a second window; and
dropping said first window on said group icon of said second window, thereby establishing a group relationship between said first and second window,
cycling focus successively between the windows in said first group in response to a focus cycle command input by the user;
shifting focus to a window in said second group in response to a focus shift command input by the user; and
cycling focus successively between the windows in said second group in response to said focus cycle command input by the user.

17. The non-transient computer readable medium of claim 16 wherein cycling focus successively between the windows in said first group comprises cycling focus bidirectionally between the windows in said first group in response to bi-directional focus cycle command inputs by the user.

18. The non-transient computer readable medium of claim 16 wherein the processor is further programmed to allow a user to form add a window to a group by, for the group to which the window is to be added,
selecting a third window;
dragging said third window to a group icon on either said first or second window; and
dropping said third window on said group icon of said first or second window, thereby adding said third window to said group.

* * * * *